US012742959B2

(12) United States Patent
Huang et al.

(10) Patent No.: US 12,742,959 B2
(45) Date of Patent: Sep. 22, 2026

(54) SCANNING MIRROR WITH DUAL AXIS GIMBAL STRUCTURE

(71) Applicant: Omnitron Sensors Inc., Los Angeles, CA (US)

(72) Inventors: Trent Huang, Los Angeles, CA (US); Jia Li, Los Angeles, CA (US); Curtis Ray, Los Angeles, CA (US); Jianing Zhao, Los Angeles, CA (US)

(73) Assignee: OMNITRON SENSORS INC., Los Angeles, IA (US)

( * ) Notice: Subject to any disclaimer, the term of this patent is extended or adjusted under 35 U.S.C. 154(b) by 363 days.

(21) Appl. No.: 18/477,316

(22) Filed: Sep. 28, 2023

(65) Prior Publication Data

US 2025/0110328 A1 Apr. 3, 2025

(51) Int. Cl.
*G02B 26/08* (2006.01)
*G01S 7/481* (2006.01)

(52) U.S. Cl.
CPC ........ *G02B 26/0833* (2013.01); *G01S 7/4817* (2013.01)

(58) Field of Classification Search
CPC .............. G02B 26/0833; G02B 26/101; G02B 26/0841; G02B 26/085; G02B 26/0858; G01S 7/4817; G01S 7/481; G01S 17/42
See application file for complete search history.

(56) References Cited

U.S. PATENT DOCUMENTS

2021/0041687 A1* 2/2021 Yokota .................... G01S 17/88
2022/0043254 A1* 2/2022 Darrer ..................... B81B 7/008

* cited by examiner

*Primary Examiner* — Euncha P Cherry
(74) *Attorney, Agent, or Firm* — NIXON PEABODY LLP

(57) ABSTRACT

A dual axis MEMS mirror assembly is disclosed. The assembly has a mirror and two arms, each having a rotational degree of motion and a translational degree of freedom. Each arm is hingedly attached to opposite ends of the mirror. A first pair of actuators is coupled to opposite ends of the first arm. A second pair of actuators is coupled to opposite ends of the second arm. The mirror is rotated around a first axis by the first and second arms when the first and second pair of actuators are rotated in the same angular direction causing the arms to translate in the translational degree of freedom. The mirror is rotated around a second axis by the first and second arms when the first and second pair of actuators are rotated in the opposite angular direction causing the arms to move in the rotational degree of motion.

20 Claims, 14 Drawing Sheets

542 532 534 552 554 524 454 410

412

572 562 564 512 440 522

850
862
860
868
866
864

SCANNING MIRROR WITH DUAL AXIS GIMBAL STRUCTURE

TECHNICAL FIELD

The present disclosure relates generally to MEMS structures. More particularly, aspects of this disclosure relate to a MEMS scanning mirror assembly with dual axis, in plane actuators to allow multiple tilt angles for the mirror.

BACKGROUND

Micro-electromechanical systems (MEMS) are microscopic devices incorporating both electronic devices and physical moving parts. A typical MEMS device is fabricated using integrated circuit techniques on a silicon wafer or wafers. The fabrication process creates the physical moving parts from fabricating different materials that may be deposited on and etched out of the substrate wafer.

MEMS have numerous applications such as in microphones, sensors, accelerometers, and light detection and ranging (LiDAR) systems. MEMS fabrication is intrinsically two dimensional to create physical structures on a substrate. Custom offsets of such structures add another dimension to MEMS topology and functionality. However, offsetting structures are often defined/limited by the dimensions of external tools and/or assembly accuracy from the fabrication process. It is desirable for such structures to have high strength to weight ratios, defined surfaces, and other features. However, fabrication of structures with such features is a challenge with existing fabrication techniques.

Scanning mirrors play an essential role in various optical applications, from barcode scanners to intricate LiDAR systems. These mirrors are used to direct light beams over a particular field or to alter the course of these beams. The precision in the scanning process, which is largely determined by factors such as scan angle, beam diameter, and frequency, is a critical feature of these mirrors.

FIG. 1 shows a prior art MEMS based mirror system 10. The mirror system 10 includes a circular mirror 12 that is mounted on a support post 14. One end of the support post 14 is attached to the bottom of the mirror 12. The opposite end of the support post 14 is attached to a moveable plate 16. A set of four electro-static actuators 20, 22, 24, and 26 are rotatable on respective flexures 30 and 32. The actuators 20 thus may be rotated by electro-static force on the flexures 30 and 32. The actuators 20, 22, 24, and 26 each are attached to an end of a support plate flexure 40 perpendicular to the axis defined by the flexures 30 and 32. The opposite end of the support plate flexure 40 is attached to a perpendicular plate flexure 42 that is in contact with an edge of the moveable plate 16. The plate flexures 42 serve to pull the movable plate 16 toward or away from a reference surface when electrostatic actuators 20, 22, 24, and 26 are rotated about an axis between flexures 30 and 32. The length of the post 14 is responsible for creating the offset between the center of mass and the center of rotation of the mirror 12.

The plate flexures 40 and 42 act as meandering springs which facilitate the transfer of rotation from the actuators 20, 22, 24, and 26 to the plate 16. This in turn tilts the mirror 12 via the post 14. The particular layout and function of these flexures that act as springs showcase the traditional methods of transferring rotational motion in scanning mirror designs.

However, current scanning mirror designs such as those in FIG. 1 often encounter limitations. These include elevated production costs and compromised durability, which are primarily a consequence of the physical configurations and structural complexities involved in their assembly. For example, it is common to mount large diameter mirrors on top of a smaller gimballed pivot plate as shown in FIG. 1. This arrangement results in an offset between the center of mass of the mirror 12 and the center of rotation.

This displacement in the center of mass introduces significant challenges. The foremost among these is the induction of undesired vibration modes. When the mirror 12 is in operation, these vibration modes produce mechanical stress on the mirror 12 and its supporting structure. Over time, this cumulative stress can diminish the operational lifespan of the mirror assembly, impacting its durability. In addition, this offset poses a risk of shock breakage. The imbalanced weight distribution can lead to increased susceptibility to shock, potentially causing the mirror 12 to break under sudden shifts in movement or direction.

Another notable issue associated with the offset-induced vibration is the degradation of image stability. Vibrations can lead to unwanted deviations in positioning the mirror 12, which in turn can disrupt the stability of the reflected image. This disturbance can cause significant degradation in image quality, hampering the overall performance and reliability of systems that rely on scanning mirrors.

Given these drawbacks, there is a clear need for an improved MEMs scanning mirror design that mitigates these challenges. Specifically, there is a need for a design that enables the center of mass of the gimballed mirror to coincide with, or closely approach, the center of rotation. There is also a need for a MEMS mirror assembly that may be fabricated to allow for precision actuators.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter; nor is it intended to be used in isolation to determine the scope of the claimed subject matter. The subject matter should be understood by reference to appropriate portions of the entire specification of this disclosure, any or all drawings and each claim.

One disclosed example is a MEMS mirror assembly that has a mirror and a first arm and a second arm. Each arm has a rotational degree of motion. Each arm is hingedly attached to opposite ends of the mirror. A first pair of actuators is coupled to opposite ends of the first arm. The first pair of actuators move the first arm in the rotational degree of motion when the first pair of actuators are rotated in an opposite direction. A second pair of actuators are coupled to opposite ends of the second arm. The second pair of actuators move the second arm in the rotational degree of motion when the second pair of actuators are rotated in an opposite direction. The mirror is rotated around a first axis by the first and second arms.

In another disclosed implementation of the example mirror assembly, the first arm has a translational degree of freedom. The first pair of actuators translate the first arm in the translational degree of freedom when the actuators are rotated in the same direction. The mirror is rotated around a second axis by the first arm when one the first pair of actuators are rotated in the same direction. In another disclosed implementation, the second arm has a translational degree of freedom. The second pair of actuators translate the second arm in the translational degree of freedom when the actuators are rotated in the opposite direction of the first pair of actuators. In another disclosed implementation, the example assembly includes a circular frame having rotational beams attached to the mirror. The circular frame is hingedly attached to the first and second arms. In another disclosed implementation, the mirror is rotatable in the circular frame by resonant motion created by oscillating movement of the first and second pair of actuators. In another disclosed implementation, each of the actuators are rotated by applying one of electro-static force, electro-magnetic force or piezo-electric force. In another disclosed implementation, each of the actuators include a rotor and a stator. In another disclosed implementation, the rotor includes a plurality of fingers that are insertable into a plurality of slots of the stator. In another disclosed implementation, the rotors and stators each include comb structures that interlace with each other and wherein the rotor and stators are rotatably connected to each other via a hinge structure. In another disclosed implementation, the comb and hinge structures are fabricated from polysilicon. In another disclosed implementation, the stator includes four plates including two lower plates with extending fingers and two upper plates with a slot array. The rotor includes four plates including two lower plates with extending fingers in alignment with the two upper plates with the slot array of the stator, and two upper plates with a slot array in alignment with the two lower plates with extending fingers of the stator. The rotor rotates in a first direction by applying power to one of the lower plates of the stator and the rotor rotates in a second direction, opposite from the first direction, by applying power to the other lower plate of the stator. In another disclosed implementation, the rotation of the mirror about the second axis has a greater angular degree of freedom than the rotation of the mirror about the first axis. In another disclosed implementation, the hinges coupling the first and second arms to the actuators are fabricated from single crystalline silicon. In another disclosed implementation, the example assembly further includes a rectangular frame providing hinged supports to the first pair of actuators and the second pair of actuators. In another disclosed implementation, the example assembly further includes a torsional bar coupling the first arm to the frame.

Another disclosed example is a light detector and ranging system that includes a beam source array having a plurality of beam sources emitting a plurality of beams. The system includes a MEMS mirror assembly that has a mirror, a first arm, and a second arm. Each arm has a rotational degree of motion and each arm is hingedly attached to opposite ends of the mirror. A first pair of actuators is coupled to opposite ends of the first arm. The first pair of actuators move the first arm in the rotational degree of motion when the first pair of actuators are rotated in an opposite direction. A second pair of actuators is coupled to opposite ends of the second arm. The second pair of actuators move the second arm in the rotational degree of motion when the second pair of actuators are rotated in an opposite direction. The mirror is rotated around a first axis by the first and second arms. The mirror is interposed to deflect each of the plurality of beams toward a target area. A controller is coupled to the MEMS mirror assembly to control the first and second pairs of actuators to tilt the mirror about the first axis to deflect the plurality of beams in a raster scan pattern toward the target area. A sensor detects the return of each of the plurality of beams from the target area. A processor reconstructs distance data derived from each of the plurality of beams in a raster pattern of the target area.

In another disclosed implementation of the example light detector and ranging system, the first arm has a translational degree of freedom. The first pair of actuators translate the first arm in the translational degree of freedom when the actuators are rotated in the same direction. The mirror is rotated around a second axis by the first arm when one the first pair of actuators are rotated in the same direction. In another disclosed implementation, each of the actuators are rotated by applying one of electro-static force, electro-magnetic force or piezo-electric force. In another disclosed implementation, the mirror assembly includes a rectangular frame providing hinged supports to the first pair of actuators and the second pair of actuators. The first and second pair of actuators are located at opposite ends of the frame and the mirror is mounted between the first and second pair of actuators.

Another disclosed example is a MEMS mirror assembly including a mirror, a first arm, and a second arm. Each of the arms have a rotational degree of motion and a translational degree of freedom. Each arm is hingedly attached to opposite ends of the mirror. A first pair of actuators is coupled to opposite ends of the first arm. The first pair of actuators translate the first arm in the translational degree of freedom when the actuators are rotated in the same direction. The first pair of actuators move the first arm in the rotation degree of motion when the actuators are rotated in an opposite direction. A second pair of actuators is coupled to opposite ends of the second arm. The second pair of actuators translate the second arm in the translational degree of freedom when the actuators are rotated in the same direction. The second pair of actuators move the second arm in the rotation degree of motion when the actuators are rotated in an opposite direction. The mirror is rotated around a first axis by the first and second arms when the first and second pair of actuators are rotated in the same direction. The mirror is rotated around a second axis by the first and second arms when the first and second pair of actuators are rotated in the opposite direction.

BRIEF DESCRIPTION OF THE DRAWINGS

The disclosure will be better understood from the following description of exemplary embodiments together with reference to the accompanying drawings, in which.

Figures 1, 2A:
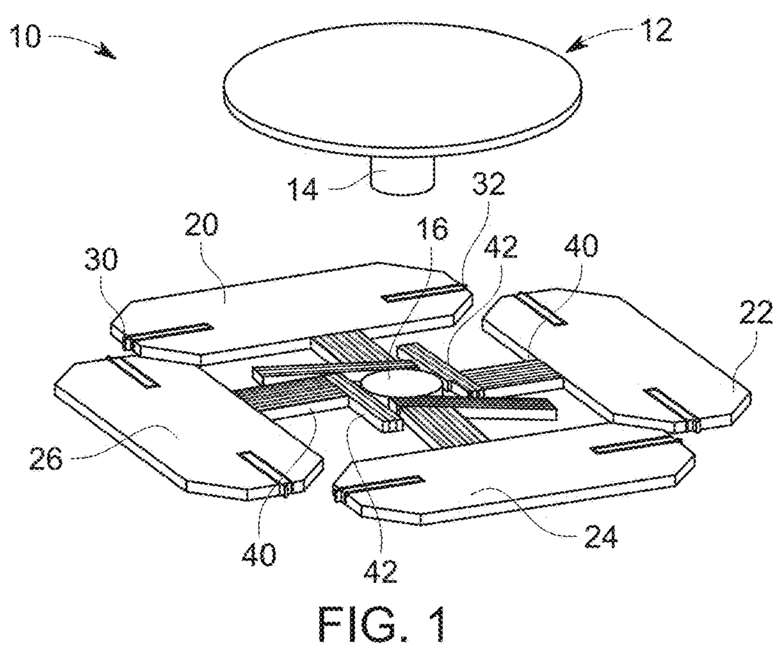
FIG. 1 is a perspective view of a prior art MEMs scanning mirror.
FIG. 2A is a top perspective view of an example MEMS scanning mirror assembly and actuators.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is directed toward a scanning mirror MEMS design with an optimized gimbal structure that effectively addresses the issues of cost, durability, scan angle, beam diameter, and frequency that commonly plague existing designs. The example scanning mirror assembly includes a frame that supports a center mirror. Either side of the frame has a pair of actuators and a side arm that are on opposite sides of the mirror. The actuators in conjunction with the side arms allow the mirror to be tilted around either a single axis or two different axes.

FIG. 2A shows a top perspective view of an example MEMS scanning mirror assembly 100 that allows the tilting of a central circular scanning mirror 110 in either of two axis orientations. The assembly 100 includes a rectangular frame 112 that supports the mirror 110 and other actuator components that allow the mirror 110 to be tilted. The assembly 100 includes four actuators 120, 122, 124, and 126 mounted on the frame 112. The actuators 120 and 122 are linked to a side arm 130 on one end of the frame 112. Both the side arms 130 and 132 have a rectangular shape. The actuators 124 and 126 are linked to an opposite side arm 132 on an opposite end of the frame 112. The mirror 110 is located between the actuators 120 and 122 and the actuators 124 and 126. As will be explained the actuators 120, 122, 124, and 126 and the side arms 130 and 132 allow the tilting of the scanning mirror 110 in two axial orientations.

In this example, the actuator 120 has a side parallel to the frame 112. The side of the rotor plate member of the actuator 120 is connected to the frame 112 by a hinge 134. The opposite side of the rotor plate member of the actuator 120 is connected to the arm 130 via another hinge 136. The opposite side of the side arm 130 is connected to a side of the rotor plate member the actuator 122 via a hinge 138. The opposite side of the actuator 122 is parallel to the frame 112. A hinge 140 links the opposite side of the rotor plate member of the actuator 122 to the frame 112.

Similarly, in this example, the actuator 124 has a side parallel to the frame 112. The side of the rotor plate member of the actuator 124 is connected to the frame 112 by a hinge 142. The opposite side of the rotor plate member of the actuator 124 is connected to the arm 132 via another hinge 144. The opposite side of the side arm 132 is connected to a side of the rotor plate member of the actuator 126 via a hinge 148. The opposite side of the actuator 126 is parallel to the frame 112. A hinge 146 links the opposite side of the rotor plate member of the actuator 126 to the frame 112. The components such as the mirror 110, actuators 120, 122, 124, and 126, and side arms 130 and 132, are fabricated on a substrate that forms the frame 112. The components are fabricated through semiconductor processes such as growing crystalline layers, etching, use of photo-lithography and the like.

The mirror 110 is supported by a circular mirror frame 150 supported within an open space 152 defined by the frame 112. The mirror 110 is also linked to arms 154 of the frame 150 via a pair of torsional beams 156 and 158. As will be explained the circular frame 150 that supports the mirror 110 may be tilted around either the x-axis or the y-axis by the actuators 120, 122, 124, and 126. Further, the torsional beams 156 and 158 allow the mirror 110 to be rotated on the axis defined by the torsional beams 156 and 158 relative to the circular frame 150. The torsional beams 156 and 158 allow the mirror 110 to be able to be excited at a resonance frequency and rotate further in angle than the actuators 120, 122, 124, and 126 would statically be able to provide.

One side of the arm 130 is parallel to the frame 112. This side of the arm 130 is connected to the frame 112 via a rotational beam 162. The opposite side of the arm 130 is linked to the mirror frame 150 via a hinge connection 164. One end of the rotational beam 162 is joined to the frame 112 via a hinge 166. The opposite end of the rotational beam 162 is joined to the side arm 130 via a hinge 168.

Similarly, one side of the arm 132 is parallel to the frame 112. This side of the arm 132 is connected to the frame 112 via a rotational beam 172. The opposite side of the arm 132 is linked to the mirror frame 150 via a hinge connection 174. One end of the rotational beam 172 is joined to the frame 112 via a hinge 176. The opposite end of the rotational beam 172 is joined to the side arm 130 via a hinge 178. In this example, the rotational beams 162 and 172 allow the side arms 130 and 132 to rotate and thus move the rotor plates of one of the connected actuators away from the stator plates. The rotational beams 162 and 172 are optional if a different type of actuator that can rotate the rotor both toward and away from the stator is used. For such different types of actuators, the rotational beams 162 and 172 can be excluded from the assembly 100.

Figures 2B, 3A:
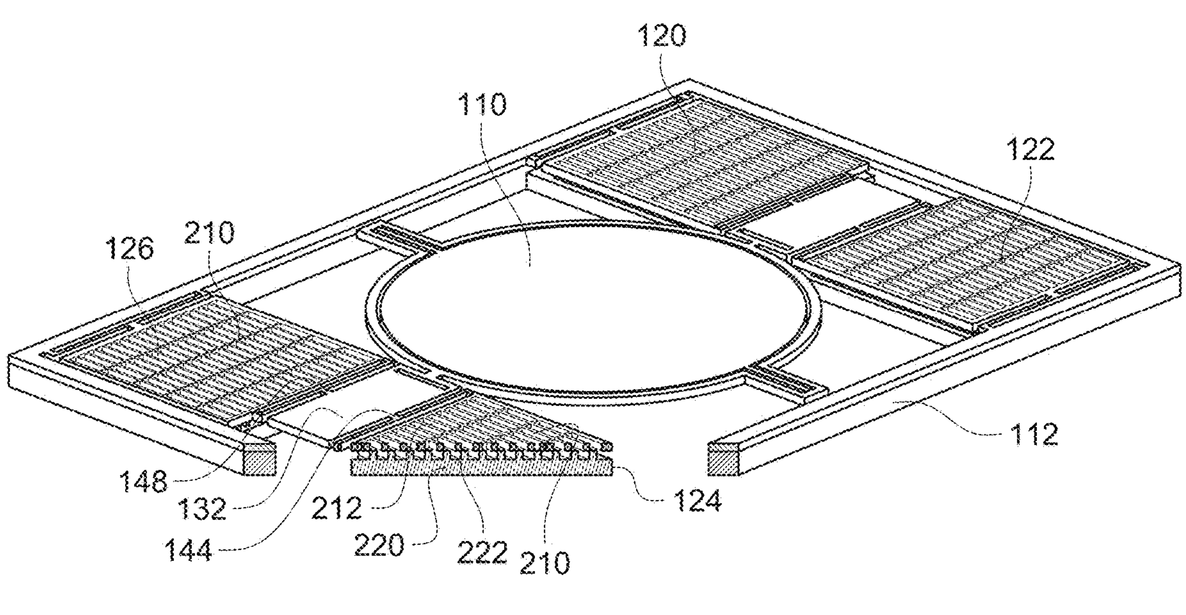
FIG. 2B is a top perspective of the example MEMS scanning mirror assembly in FIG. 2A with a cross-section view of one of the actuators.
FIG. 3A shows the mirror in the assembly in FIG. 2A tilted in one orientation.

In this example, the actuators 120, 122, 124, and 126 may be any suitable MEMS fabricated actuators. The actuators 120, 122, 124, and 126 may be rotated by a suitable power source. FIG. 2B is a perspective view of the assembly 100 with a cross section view of the actuator 124. In this example, each actuator 120, 122, 124, and 126 has a rotor plate member 210 with slots 212 that allow the rotor plate member 210 to be rotated relative to a stator plate 220 that has a series of fingers 222 that align with the slots 212 of the rotor plate member 210.

In this example, the actuators 120, 122, 124, and 126 are an electro-static drive type actuator. Thus, the fingers of the rotor plate member may be attracted to the slots based on the polarity of an applied electrical signal to the stator plate member 220, causing the rotor plate member 210 to rotate toward the stator plate 220. This in turn causes the arm 132 that is hingedly attached to the edge of the rotor plate member 210 via the hinge 144 to rotate on the rotational beam 172. The rotor plate member 210 may be physical rotated away from the stator plate member 220 by the hinge connection 144 to the side arm 132. Thus, if the side arm 132 is rotated by applying an electrical signal and depressing the rotor plate 210 of the opposite actuator 126 attached to the hinge 148, the side arm 132 will rotate and pull the rotor plate member 210 of the actuator 124 to rotate away from the stator plate member 220.

Other variations of the electro-static MEMS actuators may be used as will be described below. It is also to be understood that other types of actuators with different drives may be used for the actuators. For example, an electro-magnetic drive MEMs actuator has a magnet and a coil. Energizing the coil would repel or attract the magnet thus moving the actuators. Another example type of a MEMS actuator is a piezo-electric driven actuator that includes crystalline bending beams. In such a piezo-electric actuator, an electrical drive signal is applied to one of the bending beams causing the beam to deform and thus move the other beam.

Thus, the scanning mirror assembly 100 comprises four sections, each serving as an actuator such as the actuators 120, 122, 124, and 126. These actuators have rotor plate members that are attached on two sides via structures functioning as hinges, which are optimized to allow only one degree of rotational freedom. This configuration restricts undesired movements, focusing on the required rotational operation of the scanning mirror 110.

FIG. 2A also shows the degrees of freedom of the mirror 110 in the mirror assembly 100. A dashed line 180 represents the x-axis and a dashed line 182 represents the y-axis relative to the mirror assembly 100. A line 184 represents a dimension w, a dashed line 186 represents a dimension w2, and a dashed line 188 represents a dimension, l. The distance between the two hinges 164 and 174 parallel to the y-axis 182 is defined as the length w2 represented by the line 186. The distance "l" shown as the line 188, represents the distance between the two hinge points (one connected to the frame 112 such as the hinge 142 and the other connected to a side arm such as the hinge 144 connected to the side arm 132) of an actuator such as the actuator 124. The distance "w" shown as the line 184, represents the distance between a hinge point and the center of rotation about the x-axis 180 (the hinge 144, which is between the side arm 132 and the actuator 124). The ratio of "w" to "l" effectively provides a motion amplification for the mirror 110. As the rotor plate member of an actuator such as the actuator 124 rotates, the arm 132 attached to the actuator 124 pivots by a ratio of nearly l/w, assuming that the mirrored actuator 126 moves equal and opposite to the actuator 124.

Further, the arm 132 has a width of 2×"w" and rotates about the center of the mirror 110 along the x-axis 180. In a mirrored arrangement about the y-axis 182 located at the center of the mirror 110, two actuators 124 and 126 along with the arm 132 are on one side of the y-axis 182 and the two other actuators 120 and 122 are on the other side of the y-axis 182. The arm 132 includes hinges 174, 176 and 178 that rotate parallel to the y-axis 182. Similarly, the hinges 164, 166, and 168 also rotate parallel to the y-axis 182. The side arms 130 and 132 each have a rotational degree of motion and a translational degree of freedom.

By manipulating these actuators 120, 122, 124 and 126, for instance, if the rotor plate members of the actuators 120 and 122 rotate in the same direction such as upwards and the rotor plate members of the actuators 124 and 126 rotate in the same direction such as downwards by an equal amount, the arm 130 will translate upwards and the arm 132 will translate downwards in the respective translation degree of freedom. This causes the mirror 110 and mirror frame 150 to rotate about the y-axis 182 as the hinges 164, 166, 168, 174, 176 and 178 rotate. These hinges 164, 166, 168, 174, 176 and 178 elongate slightly during this motion. In the case of the simple electro-static actuators in this example, only one set of actuators 120 and 122 or 124 and 126 are moved downward by electrical signals, thus limiting the degree of tilt of the mirror. If other types of actuators are used that allow movement of the rotor plate both away and toward the stator, a greater degree of tilt about the y-axis 182 may be achieved.

The hinge like connections 134, 140, 142, and 146 from the frame 112 to the respective actuators 120, 122, 124, and 126, each work as a pivot point for each of the respective actuators 120, 122, 124, and 126. A virtual pivot point exists along the x-axis 180. The virtual pivot point may be defined by the optional rotational beams 162 and 172 that are included in the example assembly 100. In an assembly without the rotational beams 162 and 172, the pivot point is virtual as it is not physically defined. A motion amplification of the mirror assembly 100 is set by the ratio l/w for the x-axis 180 and roughly l/w2 for the y-axis 182. The rotor plate members of the actuators 120, 122, 124, and 126 are hinged such that the arms 130 and 132 rotate significantly along the x-axis 160 as the rotor plate members of the actuators 120 and 126 move equal and opposite to the rotor plate members of actuators 122 and 124 and less significantly along the y-axis 182 as the rotor plate members of the actuators 120 and 122 move equal and opposite to the rotor plate members of the actuators 124 and 126. This is due to the difference in length between the "w" and "w2" dimensions.

It is possible to use this difference in length in two ways: 1) Operate the mirror 110 to rotate along the y-axis 182 with a resonant mode and allow the mirror 110 to extend beyond its static condition defined by the mirror frame 150; and 2) Operate the mirror 110 to rotate along the y-axis 182 in a static condition by moving the mirror frame 150 alone and forgo moving the rotational beams 156 and 158. The resonant mode allows the mirror 110 to rotate relative to the mirror frame 150 and may be activated by continuously moving the rotor plate members of the actuators 120, 122, 124, and 126 in opposite directions to oscillate the mirror frame 150 causing the mirror 110 to rotate on the rotational beams 156 and 158. The resonant mode may be controlled by selecting a resonance frequency for the actuators that have a desired Q factor to amplify the degree of movement of the mirror 110 relative to the frame 150.

One side of the rotor plate member of each actuator 120, 122, 124, and 126 is connected to the frame 112, and the other side of the rotor plate member is connected to the arm such as the arm 132 having a width of two times "w". This arm is a hinge linked to either a mirror or a gimbal supporting the mirror. When the actuators 120, 122, 124, and 126 are in operation, they enable a rotation from the mirror frame 150 that results in the edge of the rotor plate member moving up and down. The rotor plate member of another actuator on the opposite side also moves up and down, mirroring the motion about the rotational axis. The operation of these two actuators, such as actuators 120 and 122, 180 degrees out of phase results in the rotation of the arm 130 around an axis parallel to the x-axis 180.

The crucial advantage of the example mirror assembly 100 is the ability to independently tilt the mirror 110 in the x and y axis rotations by precisely controlling the angles of the rotor plate members of the four actuators 120, 122, 124, and 126, while keeping the center of mass of the mirror 110 equal to the center of rotation. This arrangement addresses vibration issues, shock breakage risk, and image stability problems associated with conventional scanning mirror designs. The mirror assembly 100 thus presents a highly improved, robust, and efficient solution for optical applications.

FIG. 3A shows the mirror 110 and the frame 150 tilted along the y-axis 182 by causing the actuators 124 and 126 to tilt downward and optionally causing the actuators 120 and 122 tilt upwards. In the case of using electro-static actuators that only allow a power signal to rotate the rotor plate member toward the stator plate, the actuators 120 and 122 stay in a neutral position. If the actuators 120 and 122 are of a type that would allow power to rotate the rotor members upward, the actuators 120 and 122 would be tilted upwards as shown in FIG. 3A.

Figure 3B:
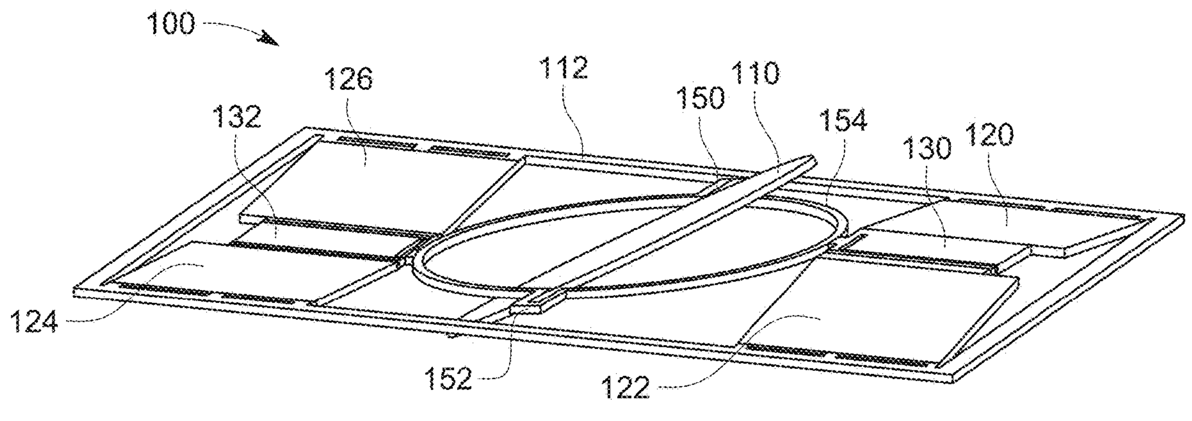
FIG. 3B shows the mirror in the structure in FIG. 2A tilted in the orientation in FIG. 3A with the mirror further tilted based on resonance created by movement of the actuators.

FIG. 3B shows the mirror 110 tilted in resonance mode relative to the frame 150. In this example, the frame 150 is tilted along the y-axis 182 by causing the rotor plate members of the actuators 124 and 126 to tilt downward while optionally the rotor plate members of the actuators 120 and 122 tilt upwards. This causes the side arms 130 and 132 to both translate in the z-axis while hinges 164 and 174 rotate and thereby rotating the frame 150 around the x-axis 180. The frame 150 may be rotated about the y-axis 182 in the opposite direction by tilting the rotor plate members of the actuators 120 and 122 down and optionally tilting the rotor plate members of the actuators 124 and 126 up. The mirror 110 is further tilted on the rotational beams 156 and 158 relative to the frame 150 by the resonance motion generated by the frame 150. The mirror 110 may be tilted in this manner in resonant mode operation as shown in FIG. 3B.

Figure 3C:
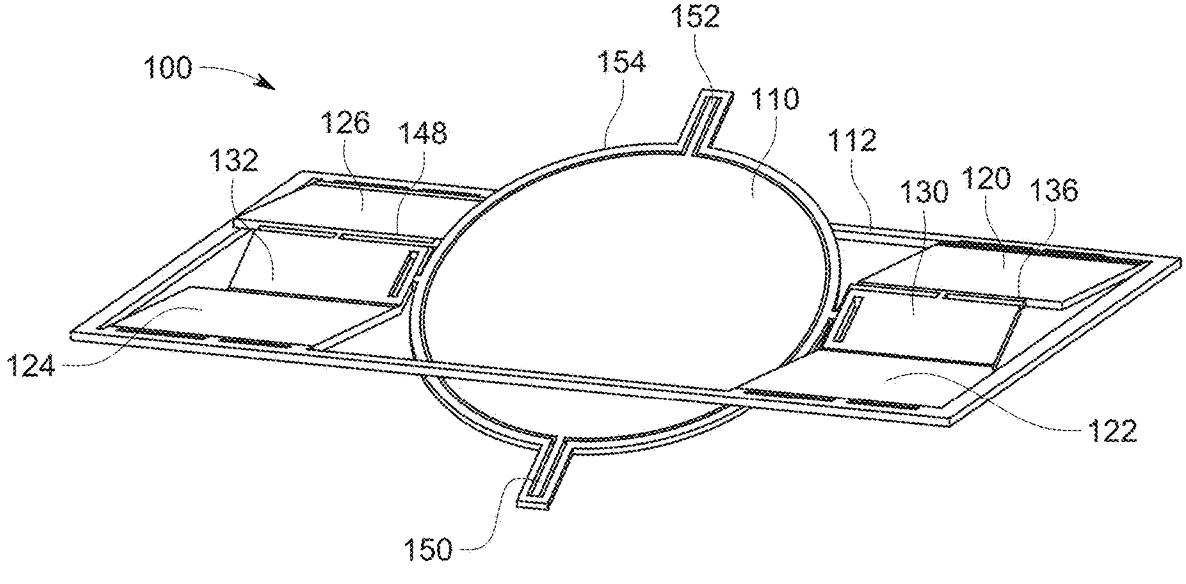
FIG. 3C shows the mirror in the structure in FIG. 2A tilted in another orientation.

FIG. 3C shows rotation of the mirror 110 about the x-axis 180 as the rotor plate members of the actuators 120 and 126 are tilted up and the rotor plate members of the actuators 122 and 124 are tilted down. In this example, power is applied to the actuators 122 and 124 causing movement of the respective rotor plate members toward the stator plate member. This causes the respective arms 130 and 132 to rotate thus pushing the rotor plate members of the respective actuators 120 and 126 to tilt up. Thus, the first pair of actuators 120 and 122 are rotationally moving in opposite directions. The second pair of actuators 124 and 126 are rotationally moving in opposite directions as well. This causes the side arms 130 and 132 to both rotate in the x-axis 180 along their respective rotational degree of freedom and thereby rotate the mirror 110 around the x-axis 180. The mirror 110 may be rotated about the x-axis 180 in the opposite direction by applying power to tilt the rotor plate members of the actuators 120 and 126 down. This rotates the arms 130 and 132 causing the rotor plate members of the respective actuators 122 and 124 to be tilted up. Of course, if the actuators 120, 122, 124, and 126 are of a type that allow power signals to be applied to rotate the rotor either up or down relative to the stator, power may be applied to all of the actuators 120, 122, 124, and 126 to tilt the mirror 110.

Figure 4A:
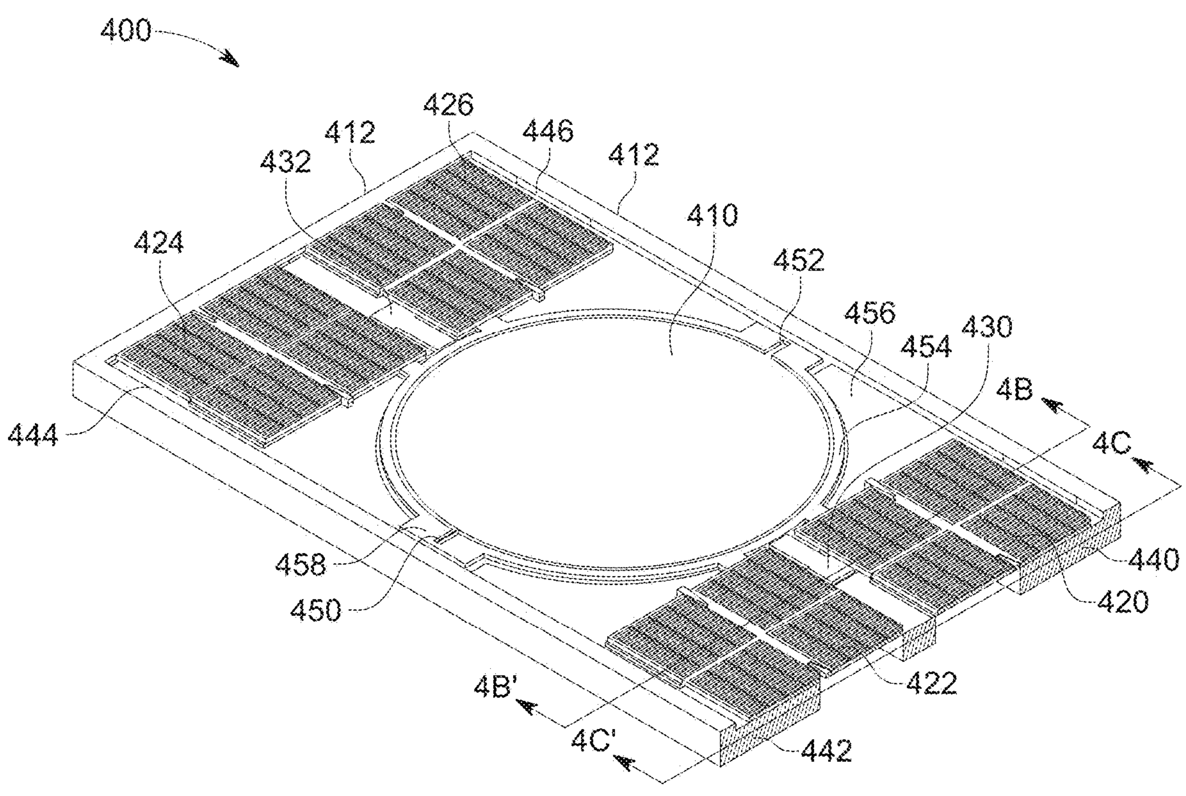
FIG. 4A is a perspective view of another example mirror assembly with different types of actuators.
Figure 4B:
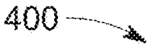
FIG. 4B is a side view along the line 4B-4B' of the example mirror assembly in FIG. 4A when the mirror is tilted on the y-axis.
Figure 4B:
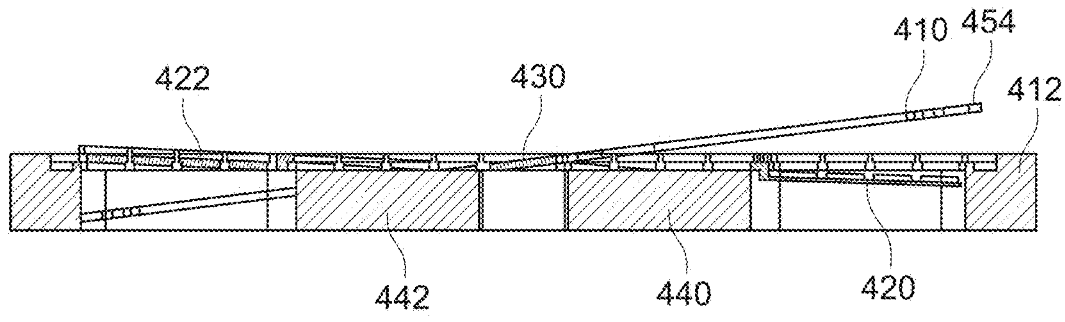
Figure 4C:
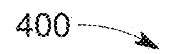
FIG. 4C is a side view along the line 4C-4C' of the example mirror assembly in FIG. 4A.
Figure 4C:
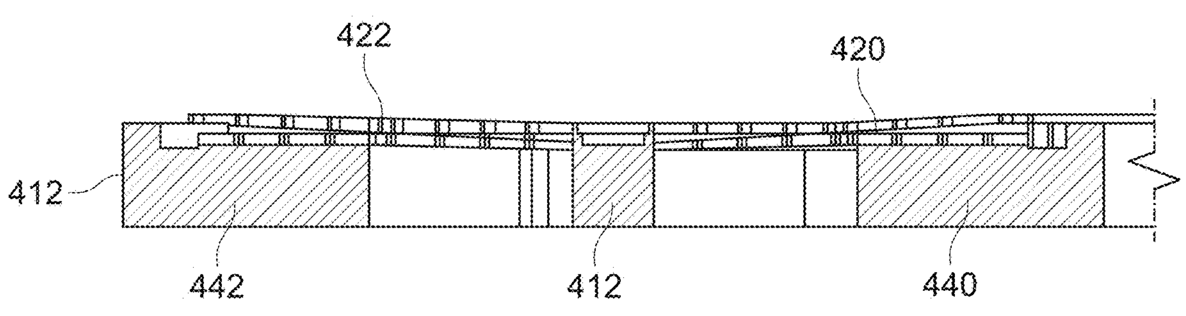

FIG. 4A shows a perspective view of a mirror assembly 400 that operates similarly to the assembly 100 in FIG. 2. FIG. 4B shows a cross-section view of the mirror assembly 400 along the line 4B-4B' in FIG. 4A showing the mirror 410 tilted on the y-axis. FIG. 4C shows a cross section view along the line 4C-4C' of the actuators on the mirror assembly 400. The mirror assembly 400 allows the tilting of a central circular scanning mirror 410. The assembly 400 includes a rectangular frame 412 that supports the mirror 410, actuators, and arms. The assembly 400 includes four actuators 420, 422, 424, and 426. The actuators 420 and 422 are linked to a side arm 430 via respective hinges on the sides of the arm 430. The actuators 424 and 426 are linked to an opposite side arm 432 via respective hinges on the sides of the arm 432.

One side of the arm 430 is parallel to the frame 412. The opposite side of the arm 430 is linked to a circular mirror frame 454 via a hinge connection. Similarly, one side of the arm 432 is parallel to the frame 412. The opposite side of the arm 432 is linked to the mirror frame 454 via a hinge connection. The mirror 410 is supported by a circular frame 454 supported within an open space 456 defined by the frame 412. The mirror 410 is also linked to arms 458 of the frame 454 via a pair of rotational beams 450 and 452.

Similar to the mirror assembly 100 in FIG. 2A, the actuators 420, 422, 424, and 426 may be tilted to move the arms 430 and 432 to tilt the mirror 410 in either the y-axis or the x-axis. In this example, the actuators 420, 422, 424, and 426 are composed of an interlocking rotor and stator that are supported by a respective base structure 440, 442, 444, and 446. As will be explained below, the rotor and stator both have two lower finger plates that are interlaced with two respective upper slot plates. Each of the base structures 440, 442, 444, and 446 are attached to one of the corners of the frame 412. FIG. 4B is a side view of the assembly 400 that shows the actuator 420 tilted upward and the actuator 422 tilted downward to tilt the arm 430 and thus rotate the mirror 410 and frame 454 along the y-axis. As explained above the actuators 424 and 426 are similarly tilted to tilt the arm 432 on the other side of the assembly 400. In contrast to the actuators in FIG. 2A, the rotors of the actuators 420, 422, 424, and 426 may be powered to either rotate toward the stators or away from the stators.

Similar to the mirror assembly 100 in FIG. 2A, the mirror 410 and frame 454 may be rotated along the y-axis by tilting the actuators 420 and 422 upward causing the arm 430 to move one end of the frame 454 upward. Simultaneously, the actuators 424 and 426 are tilted downward causing the arm 432 to move the opposite end of the frame 454 downward.

Figures 5A, 5B:
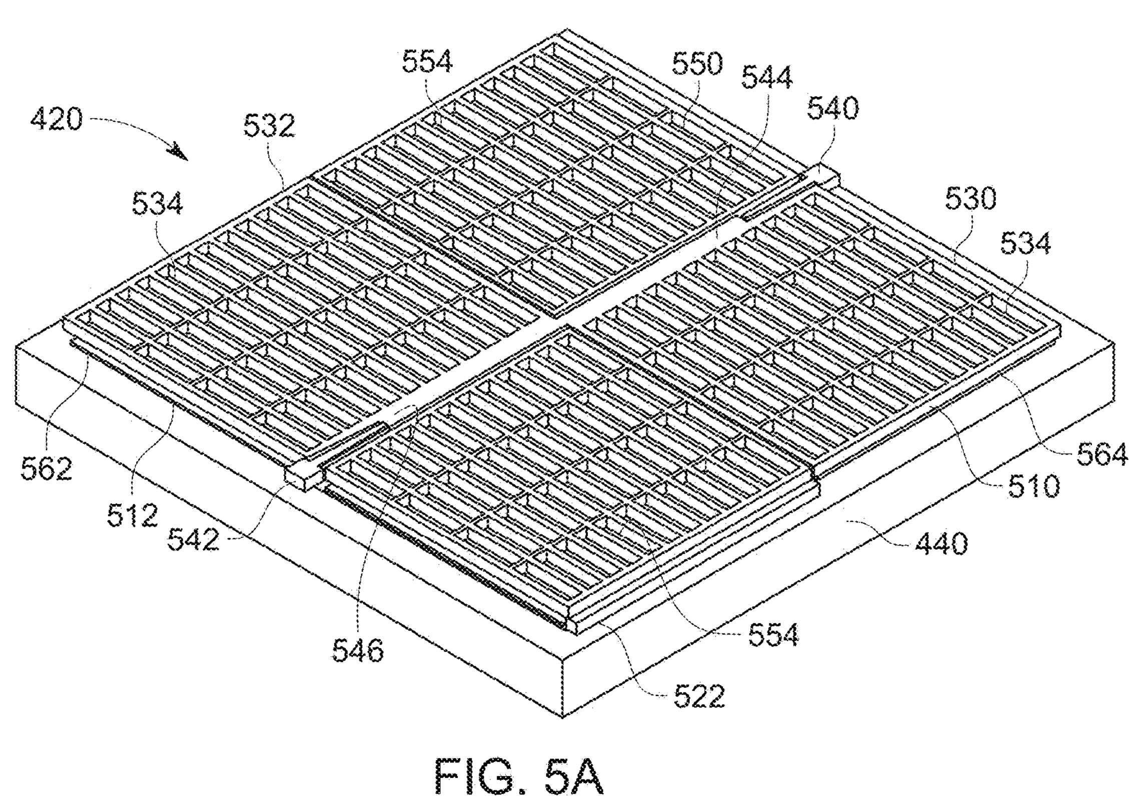
FIG. 5A is a perspective view of one of the actuators in FIG. 4A.
FIG. 5B is a side view of the one of the actuators in FIG. 4A.
Figure 5C:
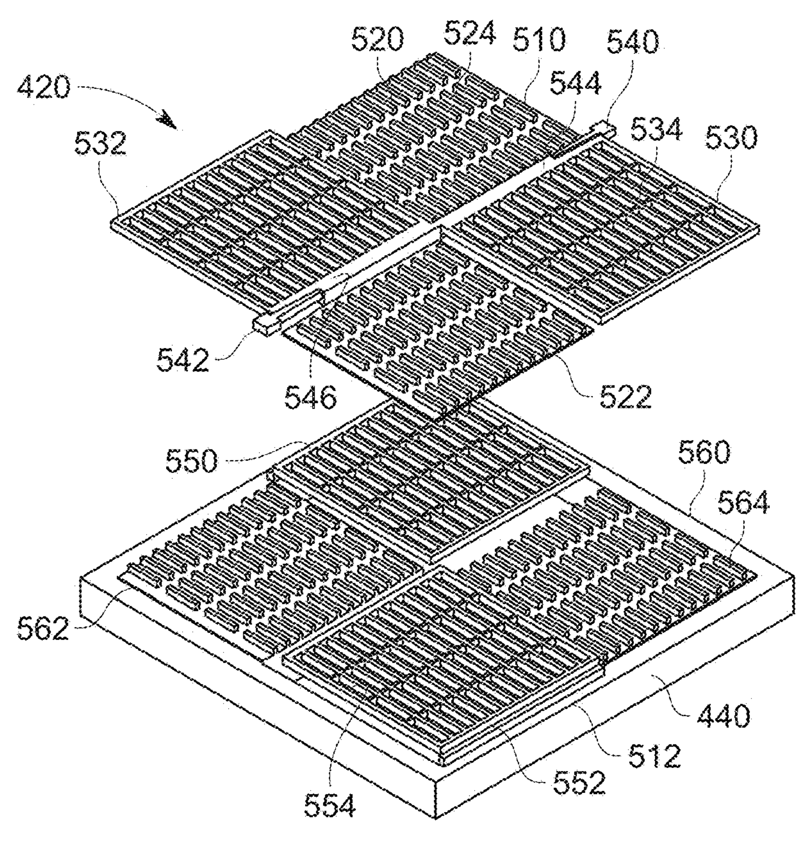
FIG. 5C is an exploded perspective of the components of one of the actuators in FIG. 5A.
Figure 5D:
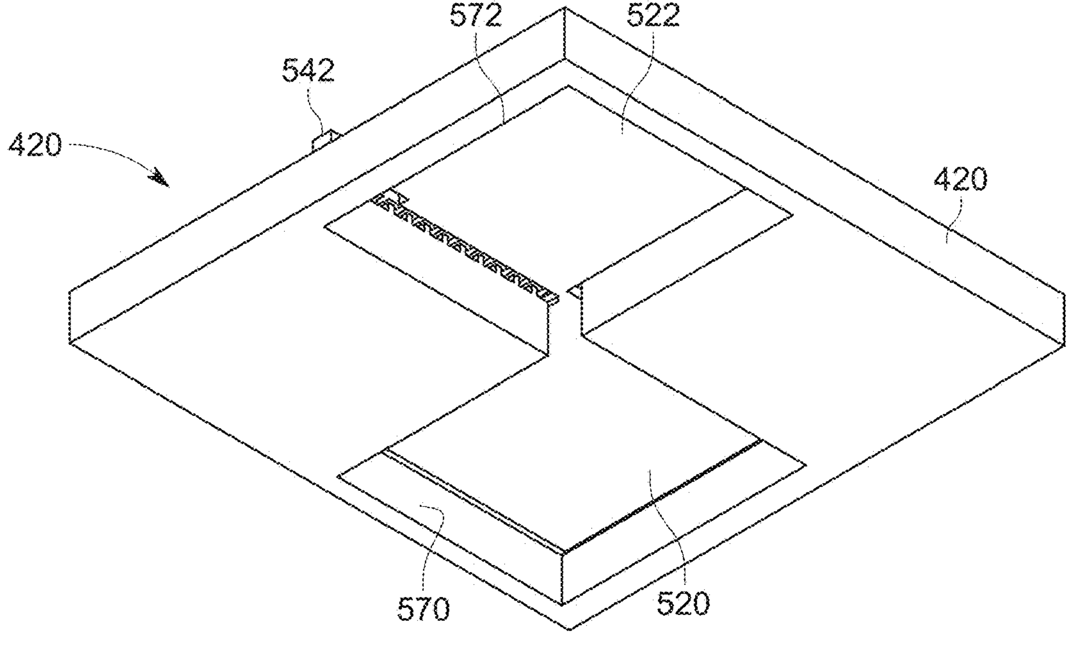
FIG. 5D is a bottom perspective view of one of the actuators in FIG. 4A.

FIG. 5A is a perspective view of one of the actuators such as the actuator 420 in FIG. 4A. FIG. 5B is a side view of the actuator 420 in FIG. 4A. FIG. 5C is an exploded perspective view of the actuator 420. FIG. 5D is a bottom perspective view of the actuator 420. The actuators in this example are balanced and include symmetrical rotor and stator structures.

The actuator 420 has a rotor 510 and a stator 512. The rotor 510 includes two lower square plates 520 and 522 each with an array of extended fingers 524. The rotor 510 also includes two upper square plates 530 and 532 each with an array of slots 534. The square plates 530 and 532 are arranged with the square plates 520 and 522 to form a grid arrangement. The plates 530 and 532 with the slots 534 are positioned higher than the plates 520 and 522 with the fingers 524. The rotor 510 is tied to two base pads 540 and 542 on ends of respective rotational beams 544 and 546. The rotor 510 thus rotates around an axis between the two base pads 540 and 542. In this example, rather than the actuator 420 having a side rotating on hinges that are connected to the frame, the base pads 540 and 542 are supported by the base structure 440 that is attached to the frame 412.

The stator 512 has two upper square plates 550 and 552 each with an array of slots 554 that are attached to the base structure 440. The stator 512 also includes two lower square plates 560 and 562 with an array of extended fingers 564 that are attached to the base structure 440. The upper square plates 550 and 552 are arranged with the lower square plates 560 and 562 in a grid arrangement. The lower plates 560 and 562 are at an elevation level with the lower plates 520 and 522 of the rotor 510. Conversely, the upper plates 550 and 552 are at a higher elevation level with the upper plates 530 and 532 of the rotor 510.

Thus, the upper plates 530 and 532 of the rotor 510 are positioned over the lower plates 560 and 562 of the stator 512 respectively. In this arrangement, the extended fingers 564 of the lower plates 560 and 562 of the stator 512 are aligned with the slots 534 of the upper plates 530 and 532 of the rotor 510. Similarly, the upper plates 550 and 552 of the stator 512 are positioned over the lower plates 520 and 522 of the rotor 510. The extended fingers 524 of the lower plates 520 and 522 of the rotor 510 are aligned with the slots 554 of the upper square plates 550 and 552 of the stator 512.

FIG. 5D shows a bottom perspective view of actuator 420 with the base structure 440 supporting the stator 512. Two clearance areas 570 and 572 are formed in the base 420 under the lower plates 520 and 522 respectively. The clearance areas 570 and 572 allows the plates 520 and 522 of the rotor 510 to rotate into the clearance areas 570 and 572.

As shown in FIG. 5B, the fingers and slots of the upper and lower plates of the rotor 510 form a capacitor with the fingers and slots of the upper and lower plates of the stator 512. The rotor 510 may be rotated along the axis formed by the base pads 540 and 542 by applying attractive forces attracting the fingers 524 of the lower plate 520 to the slots 554 of the plate 550. The attractive force may be generated by applying an electrical signal to the upper plate 550. Similarly, attractive forces attract the slots 534 of the upper plate 530 to the fingers 564 of the lower plate 560 by applying an electrical signal to the lower plate 560. The rotor 510 may be rotated in the opposite direction by applying attractive force to the fingers 524 of the lower plate 522 to move toward the slots 554 of the upper plate 552. The attractive force may be generated by applying an electrical signal to the upper plate 552. Attractive force is also applied to attract the slots 534 of the upper plate 532 toward the fingers 564 of the lower plate 562 by applying an electrical signal to the lower plate 562.

When the fingers 524 of the lower plate 520 are moved away from the slots of the upper plate 550, the plate 520 is rotated into the clearance area 570. Simultaneously, the fingers 524 of the lower plate 522 are rotated into the slots of the upper plate 552. When the actuator 420 is rotated in the opposite direction, the fingers 524 of the lower plate 520 are attracted to the slots 554 of the upper plate 550. Simultaneously, the fingers 524 of the lower plate 522 move away from the slots of the upper plate 552. When the fingers 524 of the lower plate 522 are moved away from the slots of the upper plate 552, the plate 522 is rotated into the clearance area 572.

The actuator 420 is a balanced actuator which keeps all x-axis forces balanced and yields a net zero x force while providing a z force which rotates the rotor 510 about the center axis defined by the base pads 540 and 542. Since the plates of the rotor 510 and the stator 512 are symmetrical, the forces on each remain balanced and a net zero x force is yielded when the rotor 510 is rotated in an opposite direction.

Figure 6A:
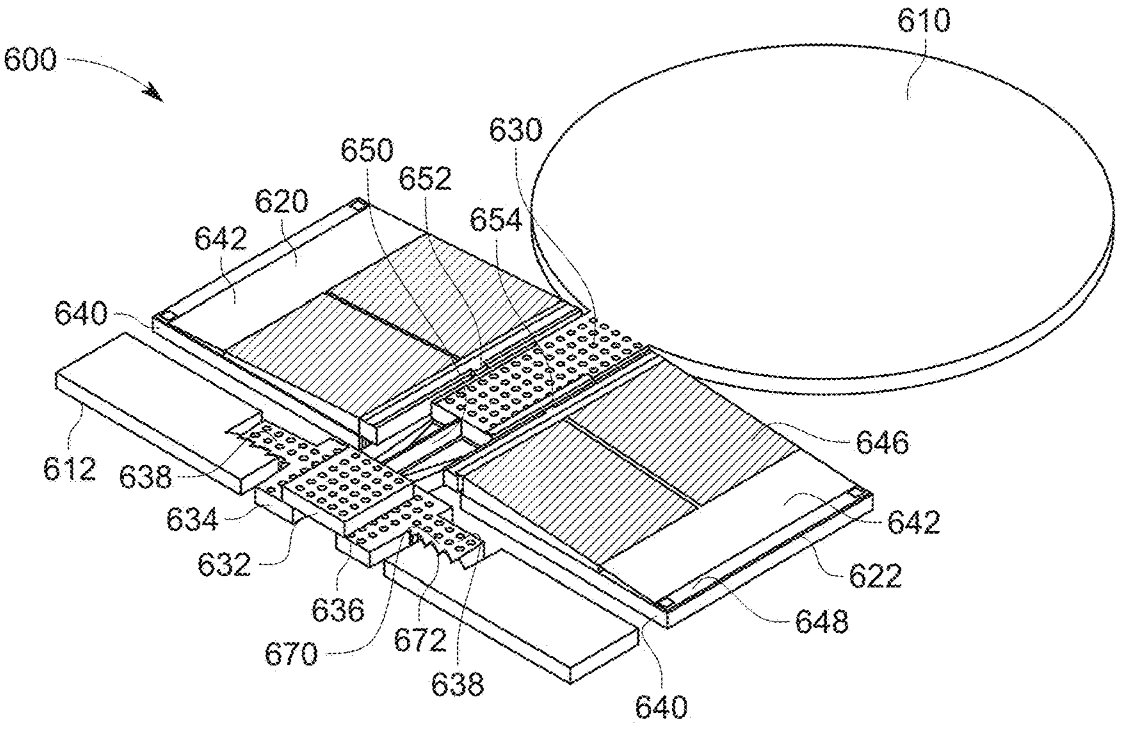
FIG. 6A is a perspective view of a comb type of actuator used with the example mirror assembly architecture.

FIG. 6A shows another example MEMS mirror assembly 600 similar to the mirror assembly 100 in FIG. 2A using a different type of actuator to rotate a mirror 610 around the x-axis. The assembly 600 includes a rectangular frame 612 that supports the mirror 610, actuators, and side arms in an arrangement similar to the assembly 100. Thus, the assembly 600 includes four actuators and two side arms that allow the mirror 610 to be tilted around an x-axis orientation. Half of the assembly 600 is shown in FIG. 6A with actuators 620 and 622. The actuators 620 and 622 control the tilt of a side arm 630 that is attached to the mirror 610. Similar to the mirror assembly 100, another set of actuators is linked to an opposite side arm (not shown in FIG. 6A).

One side of the side arm 630 is parallel to the frame 612. The opposite side of the side arm 630 is linked to the mirror 610. The frame 612 includes an anchor member 632 that is elevated and locked in this position by contact latches 634 and 636 that are positioned under the anchor member 632. Each of the latches 634 and 636 are attached to the frame 612 via tethers 638. The latches 634 and 636 may be moved to elevate the anchor member 632 to the position shown in FIG. 6A.

In this example, the actuators 620 and 622 are comb type actuators that may be fabricated using techniques that allow precise definition of features. Each actuator 620 and 622 include a lower stator 640 and an upper rotor 642. The stator 640 has a series of fine comb teeth 644 that are in proximity with corresponding comb teeth 646 of the upper rotor 642. The lower stator 640 is connected via a hinge member 648 with the upper rotor 642 that allows the upper rotor 642 to be rotated relative to the lower stator 640.

Figure 7A:
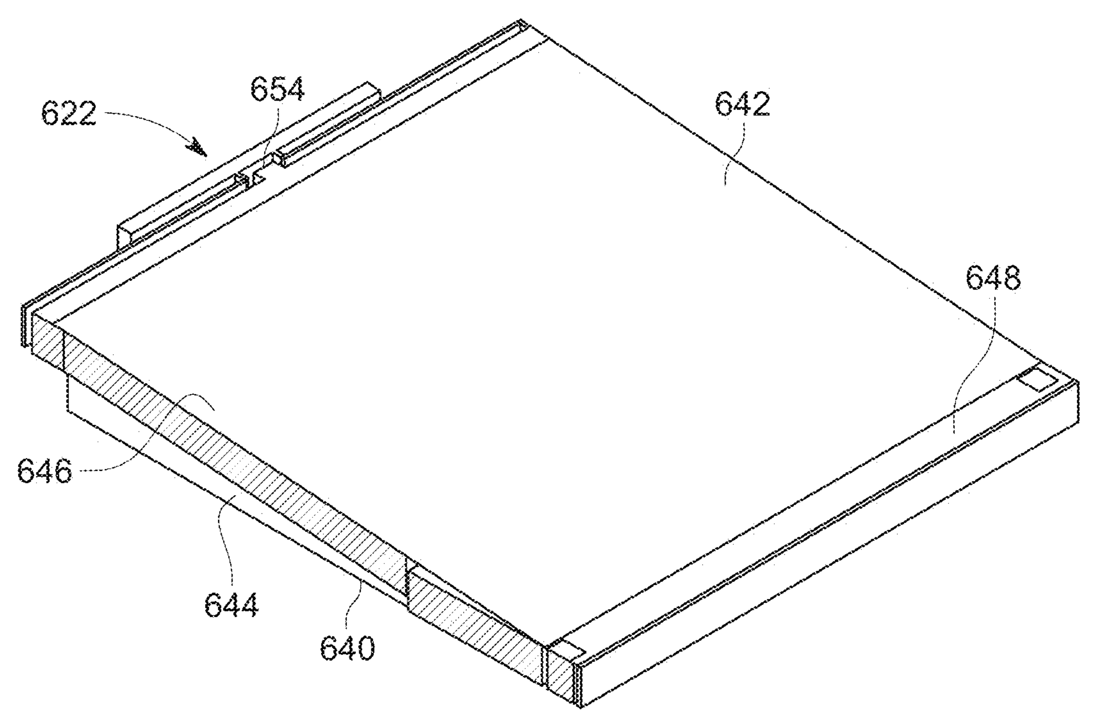
FIG. 7A is a close-up cutaway perspective view of an actuator in FIG. 6A.
Figure 7B:
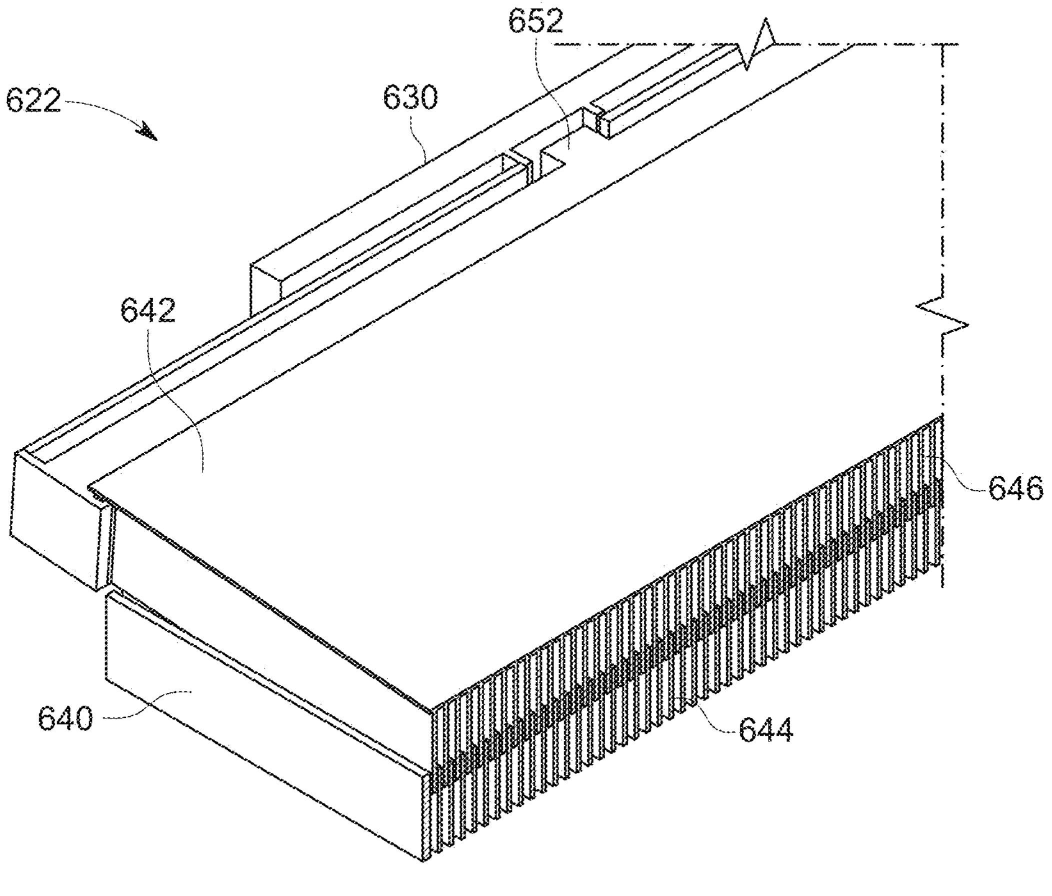
FIG. 7B is another close-up cutaway perspective view of an actuator in FIG. 6A.

FIG. 7A is a close-up perspective view of the stator 640 and the rotor 642 of the example actuator 622. FIG. 7B is a close-up cutaway perspective view of the comb teeth of the stator 640 and the rotor 642 of the actuator 622. The rotor 642 is rotated around the hinge 648 by applying electrostatic force to the comb teeth 644 of the stator 640. This creates an attractive force with the comb teeth 646 of the rotor 642 causing rotation of the rotor 642 into the stator 640.

Returning to FIG. 6A, the side arm 630 is connected via a rotational beam 650 to the anchor member 632. The opposite end of the side arm 630 is connected to the mirror 610. The side arm 630 includes a hinge member 652 connected to the actuator 620 and a hinge member 654 connected to the actuator 622.

FIG. 6A shows the mirror assembly 600 in an offset deployed state. The offset deployed state positions the mirror 610, side arm 630, and rotational beam 650 as elevated from the frame 612 by the thickness of the frame 612 which is nominally 100 μm in this example. The hinge members 652 and 654 are angled between the actuators 620 and 622 and the side arm 630 to allow the offset. Likewise, the respective rotors 642 are angled on an equal and but opposite angle relative to the stators 640 and the hingelike members 648.

In this example, the stator 640 and rotor 642 are fabricated using a polysilicon trench fill and oxide etching process to form the relatively fine features of the comb teeth 644 and 646 of the respective stator 640 and rotor 642. The hingelike members 648 are fabricated from the same polysilicon layer as the trench fill. The hinge members 652 and 654 are fabricated from single crystal material during the fabrication process.

Figure 6B:
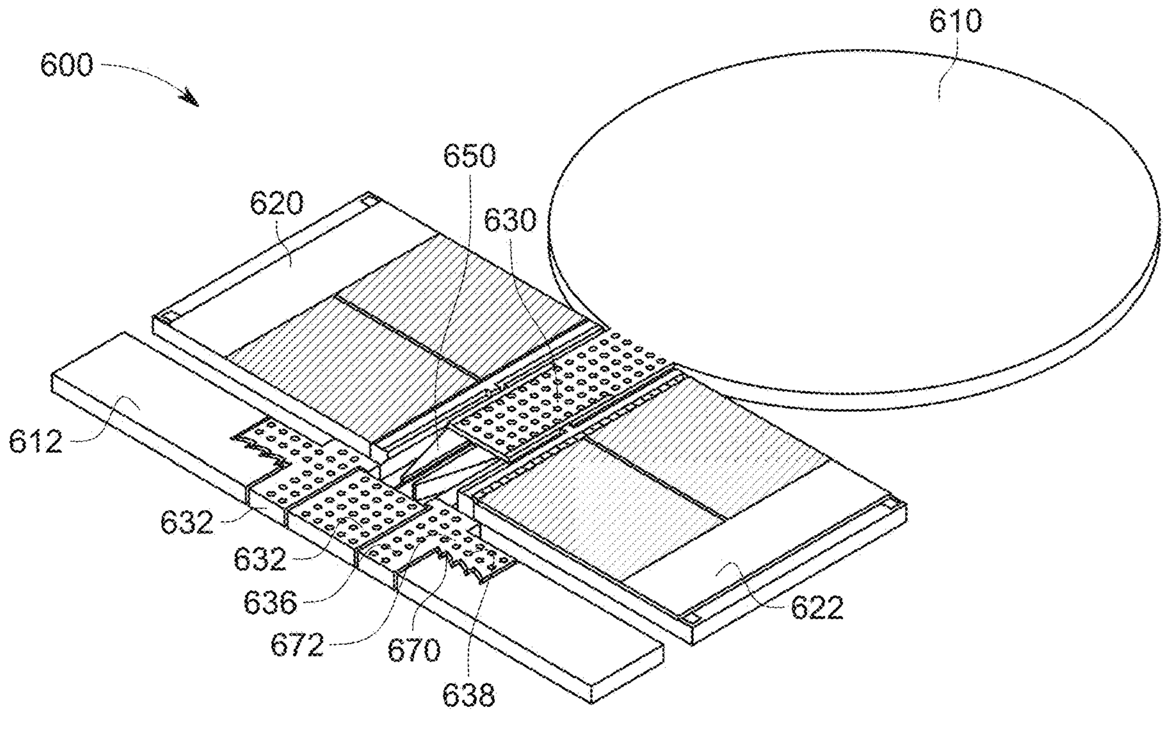
FIG. 6B is a perspective view of the initial fabrication of the mirror assembly with the comb type of actuator.

As shown in FIG. 6B, after initial fabrication, the actuators 620 and 622, the mirror 610, the side arm 630, the anchor member 632, and latches 634 and 636 are on the same plane and elevation of the frame 612. The various components are fabricated from a single substrate and deposited polysilicon and single crystal material defined by etching.

The latches 634 and 636 are attached to the tethers 638. After the initial fabrication of the components from the frame 612, the latches 634 and 636 may be moved from the position shown in FIG. 6B via a positioning tool under the mirror 610, which lifts the mirror 610, and thereby the attached side arm 630, beam 650, and anchor member 632. This allows a second positioning tool to be used to move the latches 634 and 636 together and thus swing them under the anchor member 632. These tools cause the anchor member 632 to move upward and stay latched in the upward position shown in FIG. 6A. Each tether 638 has a ratchet surface 670 that interfaces with a corresponding ratchet surface 672 etched into the frame 612. Thus, the tethers 638 and attached latches 634 and 636 may be moved toward each other, however, the interaction between the ratchet surfaces 670 and 672 prevent the tethers 638 from being moved in the opposite direction. When the latches 634 and 636 are in final position as shown in FIG. 6A, they are held in place with the interlocking ratchet surfaces 670 and 672.

As the anchor member 632 is lifted by the latches 634 and 636, the anchor member 632 via the beam 650 also elevates the side arm 630 and the attached mirror 610. The elevation of the side arm 630 rotates the rotors 642 of the actuators 620 and 622 at an angle around the hinges 648. Glue or other suitable attachment mechanisms are used to hold the anchor member 632 in place relative to the latches 634 and 636. The anchor member is thus positioned at a vertical offset regardless of shock or vibration on the frame 612. The identical anchors, actuators, latches and beams on the other side of the mirror 610 are manipulated in a similar manner in elevating the mirror 610.

Similar to the previous mirror assembly, the actuators 620 and 622 may be tilted in opposite rotational motion to move the side arm 630 in conjunction with two identical actuators and side arm on the other side of the assembly (not shown) to tilt the mirror 610 in the x-axis.

Figure 6C:
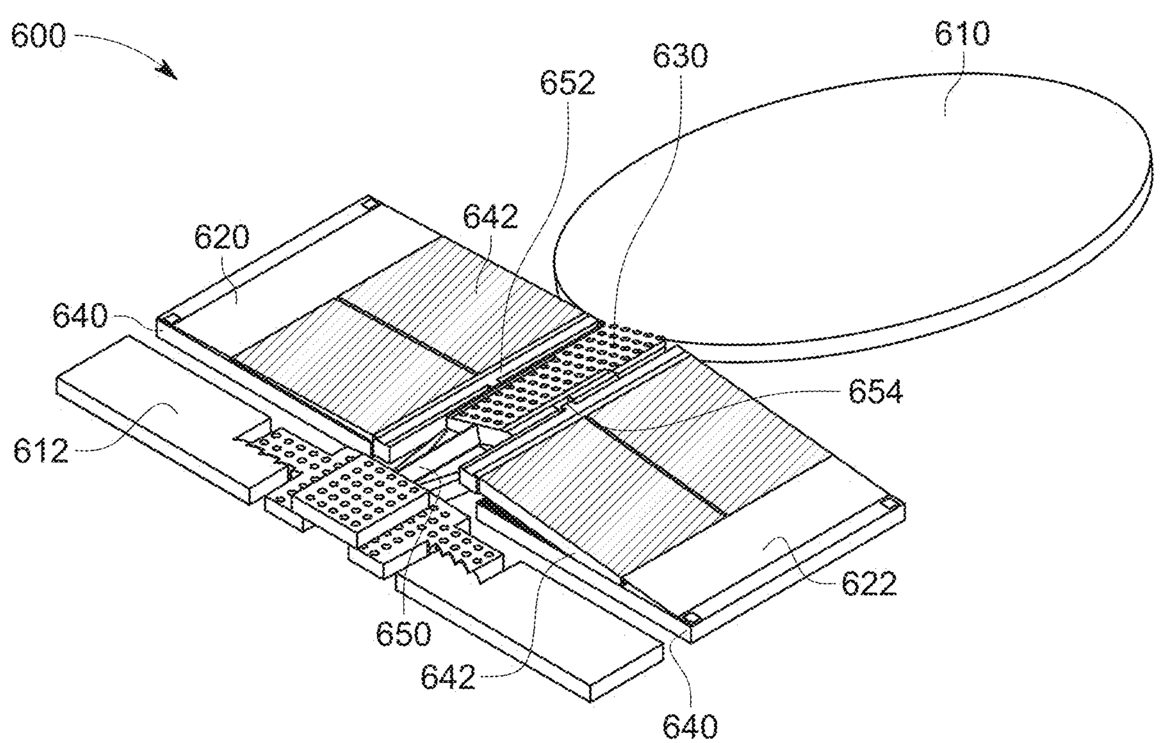
FIG. 6C is a perspective view of the actuator in FIG. 6A used to tilt the mirror about an x-axis.

FIG. 6C shows a tilt angle induced in the mirror 610 along the x-axis by driving the rotor 642 of the actuator 620 towards the stator 640 of the actuator 620. Correspondingly the rotor 642 of the actuator 622 is moved away from stator 640 of the actuator 622. The motion of the rotors 642 of the actuators 620 and 622 cause a twist in the rotational beam 650 via the side arm 630. The actuators 620 and 622 thus move the side arm 630 through the hingelike structures 652 and 654. The hinges 652 and 654 both twist to allow for the movement of the side arm 630. Similar to the operation of the assembly in FIG. 2, the other two actuators and side arm on the opposite side of the mirror 610 are moved similarly.

In order to tilt the mirror 610 in the angular other direction along the x-axis, the rotor 642 of the actuator 622 is moved away from the stator 640 of the actuator 620, while the rotor 642 of the actuator 622 is moved toward the stator 640 of the actuator 622. This causes the rotational beam 650 to twist in the opposite direction from the example shown in FIG. 6C. The actuators and side arm on the other side of the mirror 610 are actuated in a similar manner.

The example mirror assemblies allow a relatively large mirror to be deployed without imbalances by maintaining a centers of the mirror on the center of rotation. The larger mirrors supported by the example mirror assemblies allow a larger beam diameter for a LiDAR system, which allows for the beam to diverge at a smaller angle.

Figure 8A:
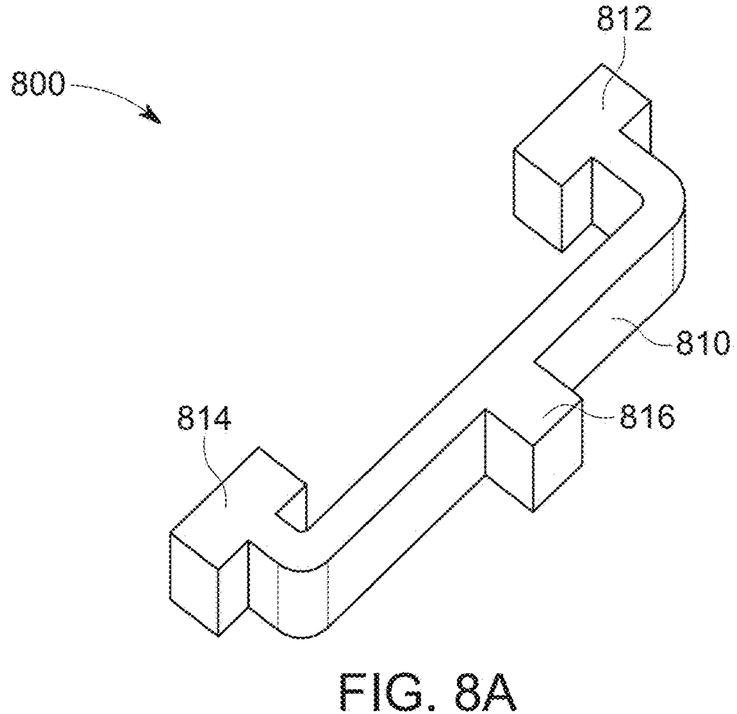
FIG. 8A is a perspective view of a first example hinge structure that may be incorporated in the example mirror assemblies.
Figure 8B:
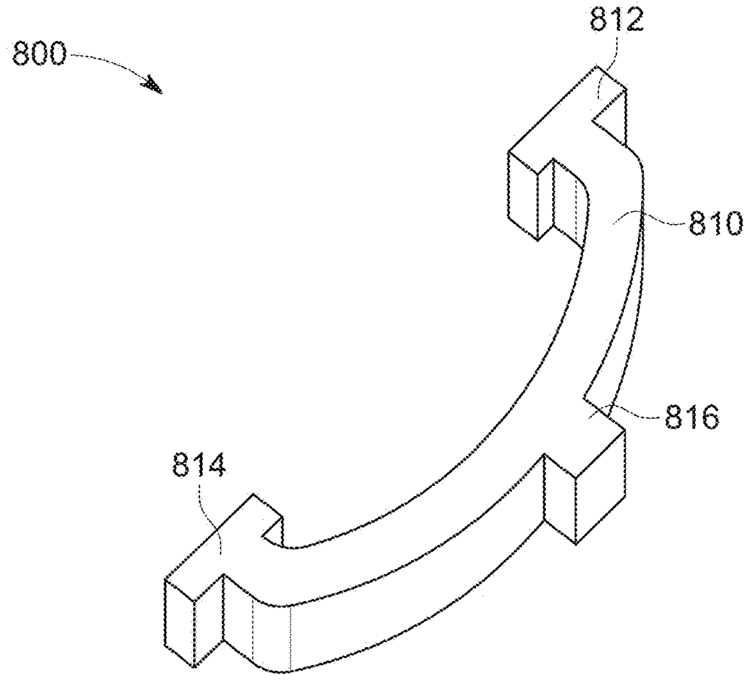
FIG. 8B is a perspective view of the hinge structure in FIG. 8A when in a rotated state.

FIG. 8A is a perspective view of a first example hinge connector 800 such as the hinge connectors 134 and 136 that join the actuators 120 and 122 to the side arm 130 in FIG. 2A. FIG. 8B is a perspective of the hinge connector 800 being rotated. The hinge connector 800 includes a lateral member 810 that has connection members 812 and 814 on opposite ends of the lateral member 810. A center member 820 is formed in the center of the lateral member 810 on a side opposite from the connection members 812 and 814. The hinge connector 800 thus has a rotational component defined by the lateral member 810 acting as a torsional beam and a horizontal component defined by the lateral member 810 acting as a lateral beam. The lateral member 810 may thus be flexed as shown in FIG. 8B. This is important as the connector 800 needs to allow some movement in the horizontal direction.

Figures 8C, 8D:
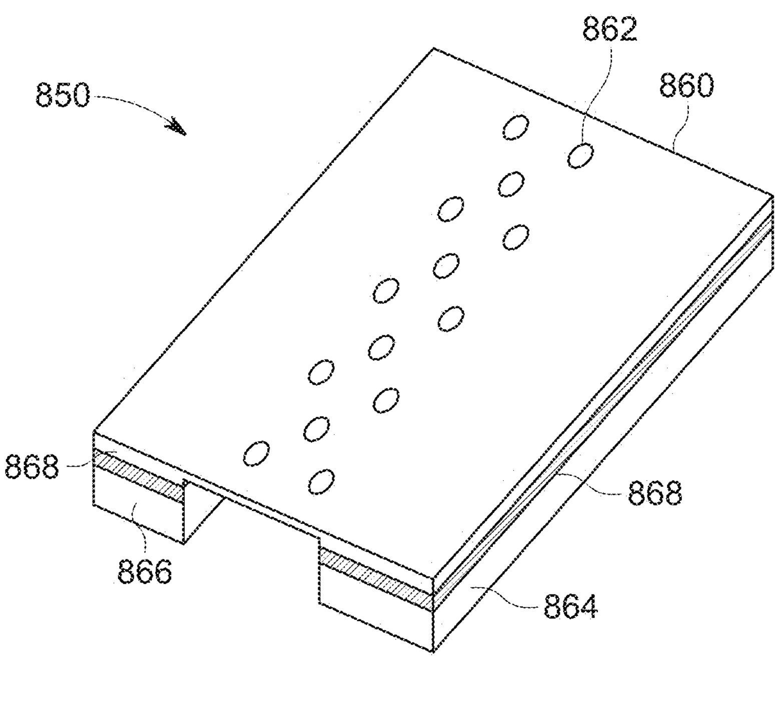
FIG. 8C is a perspective view of a second example hinge structure that may be incorporated in the example mirror assemblies.
FIG. 8D is a perspective view of the hinge structure in FIG. 8C when in a rotated state.

FIG. 8C is a perspective view of a second example hinge connector 850 that may be incorporated into the mirror assembly such as the mirror assembly 100 or 600. The hinge connector 850 includes a central plate 860 that is preferably fabricated from polysilicon. The central plate 860 that has perforations 862 formed therethrough to allow flexibility and to provide etch holes for removing an oxide layer from under the polysilicon during fabrication. The central plate 860 has two lateral members 864 and 866 that extend from opposite edges laterally. A silicon dioxide layer 868 is provided between the plate 860 and the lateral members 864 and 866. The silicon dioxide layer 868 forms the connection between the lower single crystal silicon of the lateral members 864 and 866 and the upper polysilicon of the central plate 860. In this example, the polysilicon layer 860 is approximately 2.5 um thick and the silicon dioxide layer 868 is approximately 2 um thick. The single crystal silicon lateral members 864 and 866 are 500 um thick. Thus, the hinge connector 850 is very stiff in the horizontal direction and has only a slightly reduced stiffness in the vertical direction. FIG. 8D shows the rotation of the lateral members 864 and 866 about a hinge that is defined by the perforated area of the central plate 860.

The first example hinge 800 in FIGS. 8A-8B is fabricated solely from single crystal silicon and is etched in the same manner as the rotational beams so the hinge may be fabricated with the other single crystal silicon structures in the example mirror assemblies. The example hinge 800 has rigidity in four of six degrees of freedom, unlike a conventional hinge which only has one degree of freedom and is stiff in the other five. Because the tilting actuators in the example assemblies are separating from each other while rotating, the example hinge 800 allows for this separation for without it the hinges could not move as there would not be enough degrees of freedom for the movement.

The second example hinge 850 in FIGS. 8C-8D is formed using a polysilicon deposition process such as is used in the assembly 600 and may be fabricated with other components in the assembly 600. The hinge 850 also has two degrees of freedom and 4 degrees of stiffness. In the lateral direction the example hinge 850 is particularly stiff, which is beneficial in keeping the actuator fingers from moving in the lateral direction and allowing them to only move in the vertical direction as they rotate.

Figure 9A:
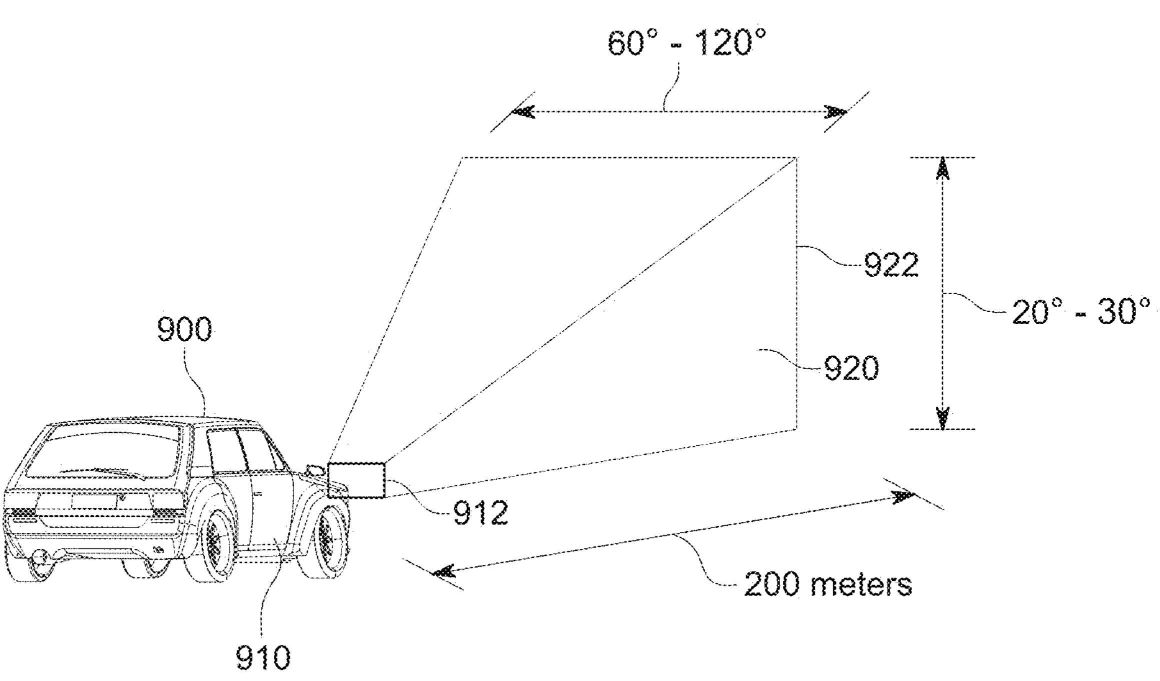
FIG. 9A is an example application of the example mirror assembly incorporated in a LiDAR system.

FIG. 9A shows an example forward looking light detector and ranging (LiDAR) system 900 that is mounted on a vehicle 910 that may be used for applications such as autonomous driving on freeways and cities. The LiDAR system 900 projects light with a field of view (FOV) shown as the dashed lines 920 to a target area 922. In this example, a horizontal field of view (FOV) ranges from 60 to 120 degrees and a vertical FOV ranges from 20 to 30 degrees for the example LiDAR system 900. In this example a nominal range is 200 meters for the example LiDAR system 900. In this example, various beam sources emit light beams that reflect from a mirror such as the mirror in the example mirror assemblies. Due to the mirror, the light beams may be reflected at different angles at a target. The light beams are reflected back from the target and detected by a detector capable of timing the time of flight of pulses of the light. The LiDAR system 900 includes a processor 912 that determines the time the beam takes to travel and return from the target for determining the range to the target and combines that with the angular data of the mirrors to create a 3D point cloud which is used for object recognition.

At 200 m distance the time of flight is 1.3 usec for a round trip of a light beam between the system 900 and the target area. This means for each beam the LiDAR system 900 can have 0.75 Mpixels/Sec. The light beam transmitter must wait until the previous flash returns before sending another flash. Any faster than that would create multiple flashes per beam with the possibility of interfering with each other, as an object at close range may appear and beat the previous flash to the receiver. Assuming a frame rate of 20 frames/sec the maximum number of pixels per laser per frame is 37,500 pixels per frame per laser. A typical requirement for a forward looking LiDAR system is 0.1 degrees resolution. If the FOV is 120×20 degrees with a 0.1 degree resolution there are 240,000 pixels per frame. Since the maximum pixels per frame per laser is 37,500 as bounded by time of flight, at least 7 lasers or beams must be used to cover this FOV at this resolution.

Figure 9B:
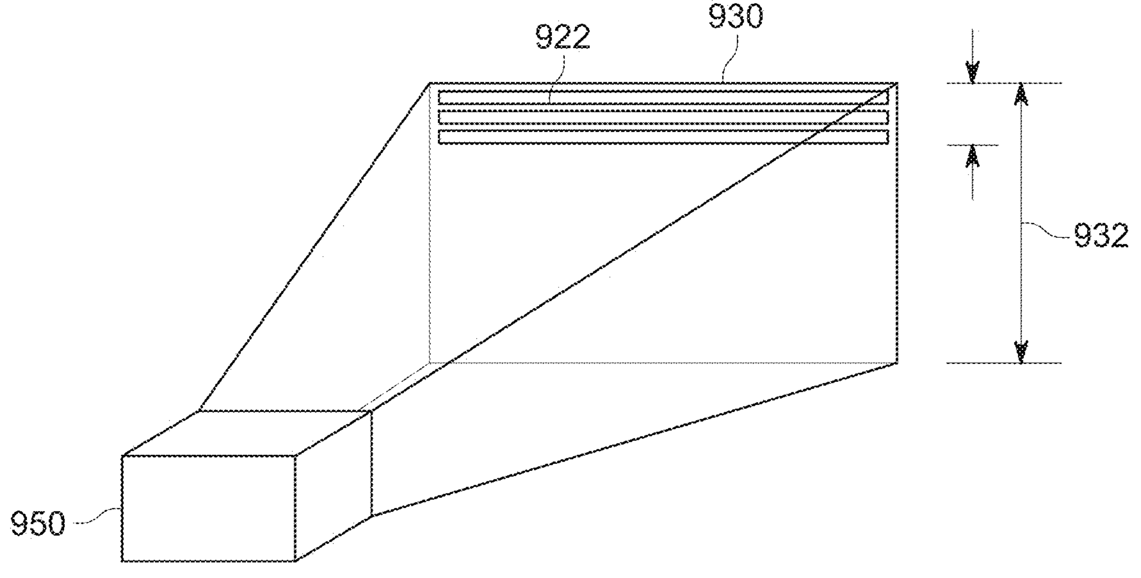
FIG. 9B is the field of view of the LiDAR system in FIG. 9A.

A typical raster scan of the FOV of the LiDAR system 900 has a horizontal scan as one scan followed by a row step in the vertical, then a return horizontal scan repeating across the FOV. Additional beams allow multiple horizontal scans to be performed simultaneously. FIG. 9B shows a raster scan pattern for imaging the target area 922 in FIG. 9A. In this example, the target area 922 is broken up into a series of horizontal scan areas 930 and a series of vertical positions 932. A beam emitter 950 emits a series of beams in a raster pattern between the horizontal scan areas 930 at the vertical positions 932.

Figure 9C:
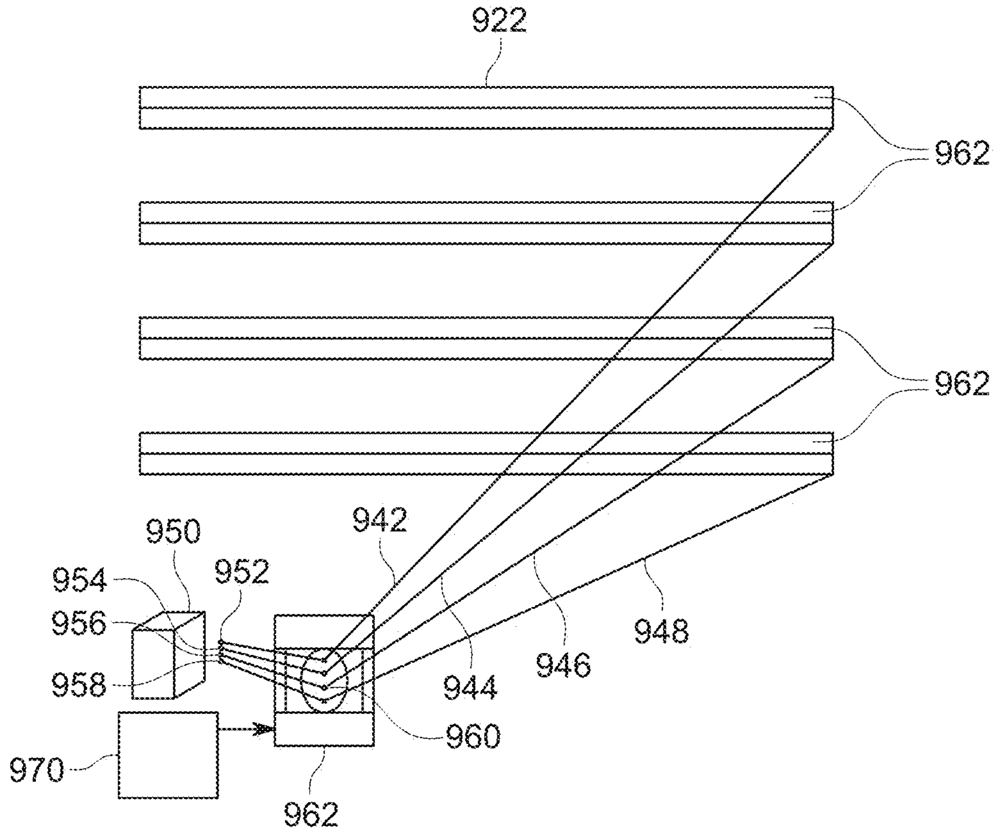
FIG. 9C shows the beams deflected by the mirror in the LiDAR system in FIG. 9A.

FIG. 9C shows the scans from some of the seven beams of the example system 900. In this example four beams 942, 944, 946, and 948 are generated from a beam source array 950 with beam sources 952, 954, 956, and 958. The beams 942, 944, 946, and 948 are directed toward a mirror 960 that may angle the beams 942, 944, 946, and 948 to different horizontal areas 962. The mirror 960 is tilted at different angles by activating actuators on a mirror assembly 962 similar to those discussed above. A controller 970 activates the actuators on the mirror assembly 962 to tilt the mirror 960 to direct each the array of beams at a different angle. The controller 970 thus controls the actuators to tilt the mirror to direct the beams 942, 944, 946, and 948 in a raster pattern over the FOV.

The vertical angular movement required for the mirror 960 is dependent on the number of beams that are reflected by the mirror 960. Since the number of beams in the LiDAR system 900 is dictated by the speed of light and pixel requirements a mirror can be designed such that the vertical angular movement requirement is less than the horizontal angular movement requirement. As explained above, the example assemblies may thus be oriented so the mirrors have the longer angular movement along the x-axis for meeting the horizontal angular movement requirement, while the y-axis may meet the shorter vertical angular requirement.

A resonant sinusoidal scan with a vertical step scan may be used. However, the pixel density is reduced at the center of the FOV, which is not ideal. In contrast, a triangular waveform produces an even pixel density over the FOV. In this case it is beneficial to have the mirror be moved on both axes in a quasistatic operation and forgo the resonance mode. This might be achieved by using the low angular movement axis as the vertical scan and the large angular movement axis as the horizontal. This might be achieved by using the low angular movement axis as the vertical scan and the large angular movement axis as the horizontal.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A MEMS mirror assembly comprising:

a mirror;

a first arm and a second arm, each having a rotational degree of motion, each arm being hingedly attached to opposite ends of the mirror;

a first pair of actuators coupled to opposite ends of the first arm, wherein the first arm has a translational degree of freedom, and wherein the first pair of actuators translate the first arm in the translational degree of freedom when the first pair of actuators are rotated in the same direction, wherein the mirror is rotated around a first axis by the first arm when the first pair of actuators are rotated in the same direction; and a second pair of actuators coupled to opposite ends of the second arm.

2. A MEMS mirror assembly comprising:

a mirror;

a first arm and a second arm, each having a rotational degree of motion, each arm being hingedly attached to opposite ends of the mirror;

a first pair of actuators coupled to opposite ends of the first arm, the first pair of actuators moving the first arm in the rotational degree of motion when the first pair of actuators are rotated in an opposite direction, wherein the mirror is rotated around a first axis by the arm, and wherein the first arm has a translational degree of freedom, and wherein the first pair of actuators translate the first arm in the translational degree of freedom when the first pair of actuators are rotated in the same direction, wherein the mirror is rotated around a second axis by the first arm when the first pair of actuators are rotated in the same direction; and a second pair of actuators coupled to opposite ends of the second arm, the second pair of actuators moving the second arm in the rotational degree of motion when the second pair of actuators are rotated in an opposite direction.

3. The mirror assembly of claim 2, wherein the second arm has a translational degree of freedom, and wherein the second pair of actuators translate the second arm in the translational degree of freedom when the second pair of actuators are rotated in the opposite direction of the first pair of actuators.

4. The mirror assembly of claim 3, further comprising a circular frame having rotational beams attached to the mirror, the circular frame being hingedly attached to the first and second arms.

5. The mirror assembly of claim 4, wherein the mirror is rotatable in the circular frame by resonant motion created by oscillating rotation of the first and second pair of actuators.

6. The mirror assembly of claim 1, wherein each of the actuators are rotated by applying one of electro-static force, electro-magnetic force or piezo-electric force.

7. The mirror assembly of claim 1, wherein each of the actuators include a rotor and a stator.

8. The mirror assembly of claim 7, wherein the rotor includes a plurality of fingers that are insertable into a plurality of slots of the stator.

9. The mirror assembly of claim 7, wherein the rotors and stators each include comb structures that interlace with each other and wherein the rotor and stators are rotatably connected to each other via a hinge structure.

10. The mirror assembly of claim 7, wherein the comb and hinge structures are fabricated from polysilicon.

11. The mirror assembly of claim 7, wherein the stator includes four plates including two lower plates with extending fingers and two upper plates with a slot array, and wherein the rotor includes four plates including two lower plates with extending fingers in alignment with the two upper plates with the slot array of the stator, and two upper plates with a slot array in alignment with the two lower plates with extending fingers of the stator, wherein the rotor rotates in a first direction by applying power to one of the lower plates of the stator and the rotor rotates in a second direction, opposite from the first direction, by applying power to the other lower plate of the stator.

12. The mirror assembly of claim 2, wherein the rotation of the mirror about the second axis has a greater angular degree of freedom than the rotation of the mirror about the first axis.

13. The mirror assembly of claim 1, wherein the hinges coupling the first and second arms to the actuators are fabricated from single crystalline silicon.

14. The mirror assembly of claim 1, further comprising a rectangular frame providing hinged supports to the first pair of actuators and the second pair of actuators.

15. The mirror assembly of claim 13 further comprising a torsional bar coupling the first arm to the frame.

16. A light detector and ranging system comprising:

a beam source array having a plurality of beam sources emitting a plurality of beams;

a MEMS mirror assembly including:

a mirror;

a first arm and a second arm, each having a rotational degree of motion, each arm being hingedly attached to opposite ends of the mirror;

a first pair of actuators coupled to opposite ends of the first arm, the first pair of actuators translate the first arm in a translational degree of freedom when the first pair of actuators are rotated in the same direction; and a second pair of actuators coupled to opposite ends of the second arm;

a controller coupled to the MEMS mirror assembly to control the first and second pairs of actuators to tilt the mirror about the first axis to deflect the plurality of beams in a raster scan pattern toward the target area;

a sensor to detect the return of each of the plurality of beams from the target area; and a processor to reconstruct distance data derived from each of the plurality of beams in a raster pattern of the target area.

17. The light detector and ranging system of claim 16, wherein the first arm has a rotational degree of motion, and wherein the first pair of actuators move the first arm in the rotational degree of motion when the first pair of actuators are rotated in an opposite direction, wherein the mirror is rotated around a second axis by the first arm when the first pair of actuators are rotated in the opposite direction.

18. The light detector and ranging system of claim 16, wherein each of the actuators are rotated by applying one of electro-static force, electro-magnetic force or piezo-electric force.

19. The light detector and ranging system of claim 16, wherein the mirror assembly includes a rectangular frame providing hinged supports to the first pair of actuators and the second pair of actuators, and wherein the first and second pair of actuators are located at opposite ends of the frame and the mirror is mounted between the first and second pair of actuators.

20. A MEMS mirror assembly comprising:

a mirror;

a first arm and a second arm, each having a rotational degree of motion and a translational degree of freedom, each arm being hingedly attached to opposite ends of the mirror;

a first pair of actuators coupled to opposite ends of the first arm, the first pair of actuators moving the first arm in the translational degree of freedom when the first pair of actuators are rotated in the same direction, and rotating the first arm in the rotational degree of motion when the first pair of actuators are rotated in an opposite direction; and a second pair of actuators coupled to opposite ends of the second arm, the second pair actuators moving the second arm in the translational degree of freedom when the second pair of actuators are rotated in the same direction, and rotating the second arm in the rotational degree of motion when the second pair of actuators are rotated in an opposite direction, wherein the mirror is rotated around a first axis by the first and second arms when the first and second pair of actuators are rotated in the same direction, and wherein the mirror is rotated around a second axis by the first and second arms when the first and second pair of actuators are rotated in the opposite direction.

* * * * *